May 1, 1962  LE ROY W. WALLACE  3,032,290
AUTOMATIC SPINNING REEL
Filed Oct. 17, 1957  3 Sheets-Sheet 1
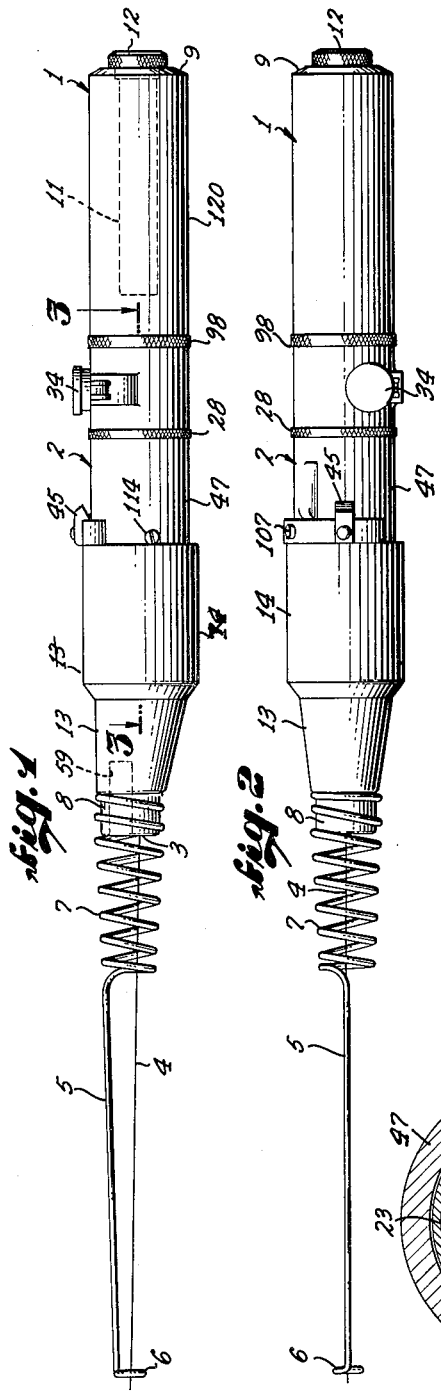
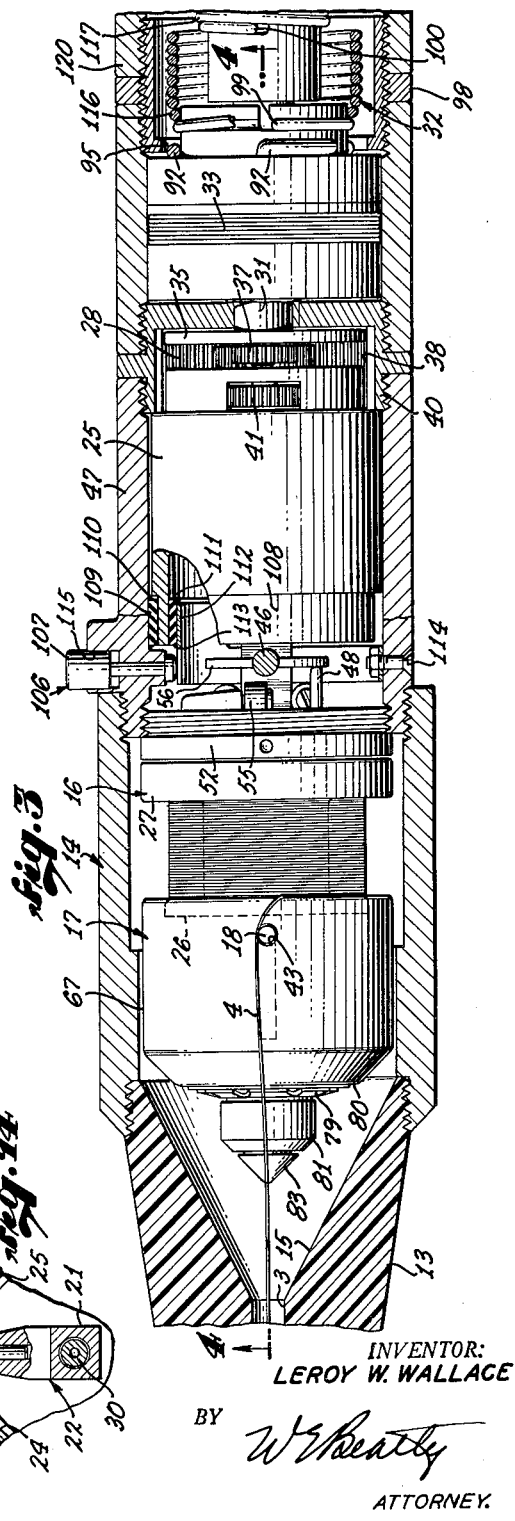
INVENTOR:
LEROY W. WALLACE
BY
W. E. Beatty
ATTORNEY.

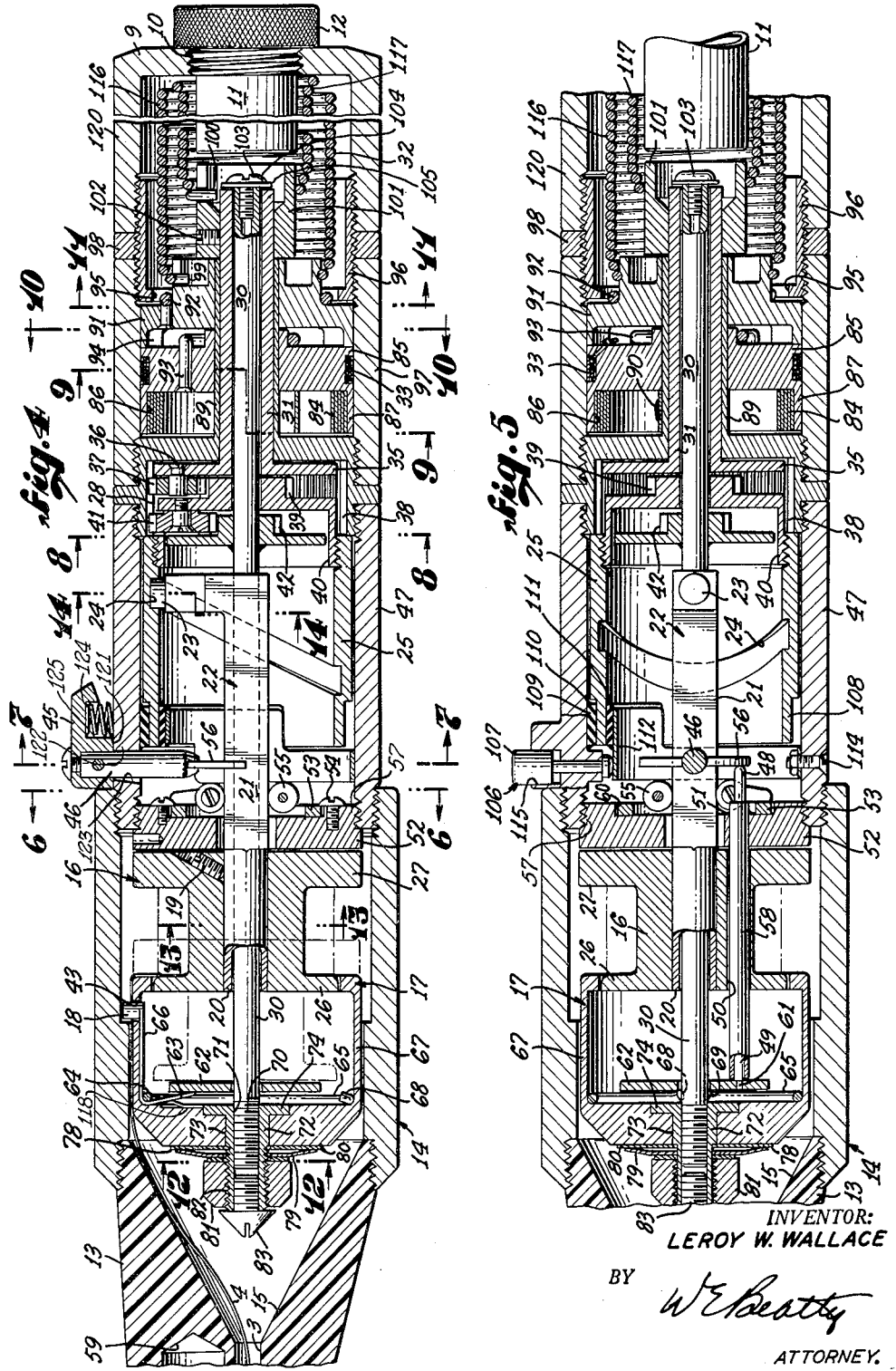

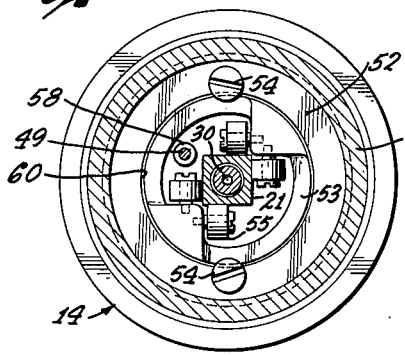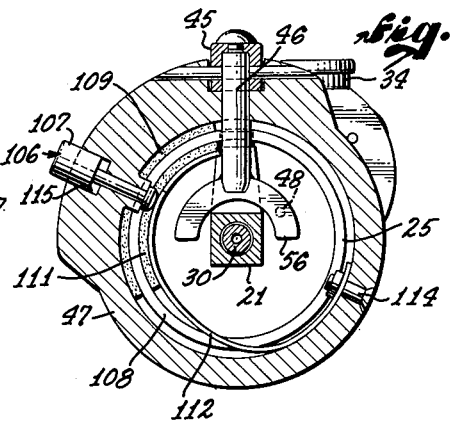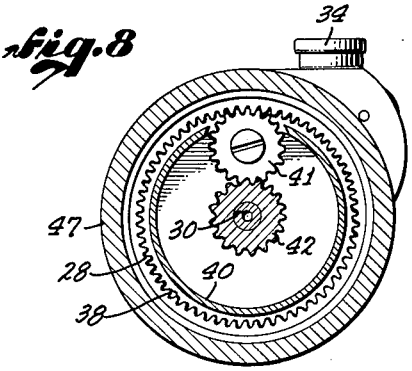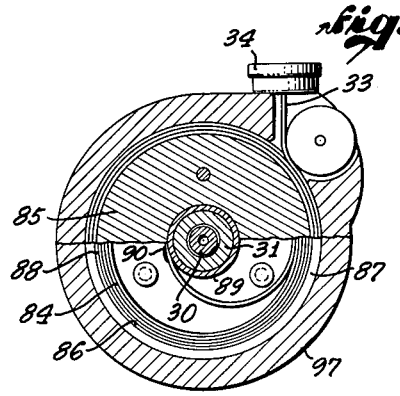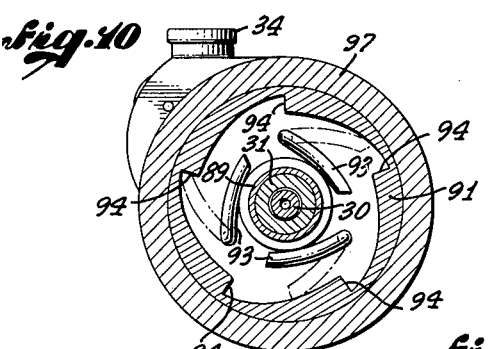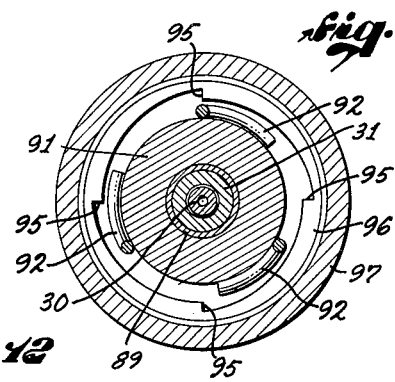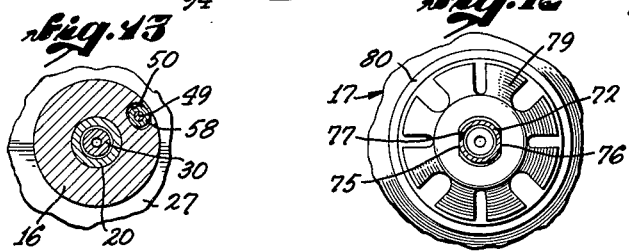

United States Patent Office 3,032,290
Patented May 1, 1962

3,032,290
AUTOMATIC SPINNING REEL
Le Roy W. Wallace, 2447 Claremont Ave.,
Los Angeles, Calif.
Filed Oct. 17, 1957, Ser. No. 690,673
10 Claims. (Cl. 242—84.21)

The invention relates to an automatic spinning reel and more particularly to a spinning reel wherein the fishing line or the like wound on the spool is retracted automatically by spring tension under control of a brake.

While automatic fishing reels are well known, the principle of automatic operation has not been applied to a spinning reel, the present invention accomplishing this for the first time so far as I am aware. Hence the principal object of the invention is to apply the principle of automatic operation to a spinning type of reel.

A further object is to provide an improved spring construction for operating the spinning reel. This is accomplished by providing a helical spring wherein one portion thereof is surrounded by and coaxial with another portion, giving the equivalent of a spring which is longer than its overall length and a more compact assembly.

The invention provides a means for winding the spring to provide tension available for rewinding the spool.

Experience has shown that with a reel which is about the size of that shown in FIGS. 3, 4 and 5, it is possible to retract about 20 feet of the line by releasing the spring tension before it is necessary to rewind the spring.

A further object of the invention is to provide a spinning reel of the automatic type housed in a casing which may serve as the handle of a fishing rod.

Various other improvements and advantages are obtained, as will appear from the detailed description.

For further details of the invention, reference may be made to the drawings wherein FIG. 1 is a plan view of a fishing rod having a handle serving as a casing for the working parts of an automatic spinning reel according to the present invention.

FIG. 2 is a view corresponding to FIG. 1 with the fishing rod rotated a quarter turn about its axis.

FIG. 3 is an enlarged view partly in section on line 3—3 of FIG. 1.

FIG. 4 is a sectional view on line 4—4 of FIG. 3.

FIG. 5 is an enlarged sectional view corresponding to FIG. 4, with the casing and its parts rotated about the longitudinal axis of the casing.

FIGS. 6 to 14 inclusive are sections on lines of the corresponding numbers in FIG. 4 looking in the direction of the respective arrows.

Referring in detail to the drawings, the fishing rod 1, in FIGS. 1 and 2, has a handle 2 which provides an elongated cylindrical casing for the automatic spinning reel of the present invention. This casing 2 has a coaxial central opening 3, see also FIG. 3, for a fishing line indicated at 4. The fishing rod is here shown as a short straight piece of spring wire 5 having a line guide 6 at its outer end and having a coil 7 at its inner end to removably fit on the hub 8 at the outer end of the casing section 13 which also has a socket 59 to removably receive the end of a conventional fishing rod. The other end of the casing, as shown in FIGS. 1 and 4, has an end wall 9 having a threaded bore 10 to receive a container 11 having a knurled removable cap 12. The container 11 may house a screw driver or other tools useful for adjusting or repairing the parts of the reel.

The hub 8 is arranged on an end casing section 13, as shown in FIG. 4, threaded into casing section 14. The section 13 has a conical bore 15 to guide the line 4 to the axial opening 3.

The fishing line 4 is stored on a spool 16, as shown in FIGS. 4 and 5. Spool 16 reciprocates without rotating, while the closed flyer 17 and its finger 18 rotate without reciprocating.

Spool 16 is fastened by set screw 19 to the tubular member 20 which is an extension of the square section 21, see also FIG. 7, of the cam follower member 22 having a follower 23 which rides in an endless inclined cam groove 24 of the hollow cylindrical cam 25. The throw of cam groove 24 in an axial direction is that corresponding to the distance between the flanges 26 and 27 of the spool, being arranged so that the line from the finger 18 will be laid along the available length of the spool.

To prevent the line from piling up on the spool so that the finger 18 will be at successively different positions of rotation as the cam follower 23 reaches the end of its stroke, a differential gearing coupling 28 is provided between the hollow cam 25 and the rotatable shaft 30 on which the flyer 17 is mounted. As will be explained later, hollow shaft 31 is driven by spring 32 which is wound up with a cord 33 having a button 34, see FIG. 9. Hollow shaft 31, as shown in FIG. 4, has a radially extending flange 35 having a stud 36 rotatably carrying a gear 37 which meshes with the internal ring gear 38 which forms one of the casing sections. Gear 37 also meshes with and drives gear 39 on a carrier 40 having a planetary gear 41 which meshes with another portion of the gear 38 to drive the gear 42 which is fastened to the shaft 30. Flyer 17 is mounted rotatably on shaft 30 under control of drag spring 79.

As shown in FIG. 9, also FIGS. 4 and 5, the cord 33 is rewound with a helical spring 84. Cord 33 is arranged in a drum 85 having a cylindrical flange 87 providing a recess 86 housing a spring 84. As shown in FIG. 9, the outer end of spring 84 is fixed to flange 87 as shown at 88 while the inner end thereof is fixed to stationary sleeve bearing 89 as shown at 90. Sleeve bearing 89 is integral with and forms an extension of the ring gear 38, providing a bearing surface on its outside for drum 85 and for rotatable head 91 carrying centrifugal dogs 92, as shown in FIG. 11, while the inside of sleeve bearing 89 provides a bearing for the hollow shaft 31 which in turn has a bearing support on rod 30.

The winding drum 85 has centrifugally operated dogs indicated at 93 in FIG. 10 for engagement with notches like 94 in the rotatable head 91. The dogs 92 engage notches like 95 in the outer end wall of a sleeve 96 which is threaded into the casing section 97. The nut 98 and the housing 120 which serves as lock nut are also threaded onto the sleeve 96, as shown in FIGS. 4 and 5.

When the button 34 is pulled to rotate the drum 85, the dogs 93 fly out and engage notches 94 to rotate head 91 which is fastened to the end 99 of spring 32 to wind up this spring. When the button 34 is released, the cord is rewound by spring 84 and dogs 92 fly out to engage notches 95 to prevent the spring 32 from unwinding. Motion is transferred from spring 32 to flyer shaft 30 as follows. The inner end 100 of spring 32 is fastened in a block 101 fastened by a set screw 102 to hollow shaft 31. Shaft 30 is mounted or retained in hollow shaft 31 by screw 103 which is screwed into the inner end of shaft 30 and having a head 104 and a washer 105 to overlie the end of hollow shaft 31.

To continuously change the phase of operation of the rotating finger 18 with respect to the reciprocation of the spool 16, as above described, as shown in FIGS. 3, 4 and 5, the gears 41 and 42 have different numbers of teeth. For example, gear 42 may have one tooth less than gear 41.

For free spool operation, the finger 18 is retracted from the path of line 4 by rotating the handle 45. Handle 45 is mounted on a radially extending shaft 46 carried by the casing section 47. As shown in FIG. 7, shaft 46 has a fork 56 which straddles the cam follower sleeve 21, in position, as shown in FIG. 5, to engage the end 48 of a rod 49 slidably mounted in a tube 58, welded or cemented to the block 52, as shown at 51. Spool 16 has an enlarged hole 50 through it to allow spool 16 to reciprocate on tube 58 without drag. Bearing block 52 is fastened to the casing section 47 by threads 57, inside of casing section 14. Bearing block 52, as shown in FIG. 6, carries a ring 53 removably held in position by screws like 54 and carrying four bearing rollers like the one indicated at 55, one for each of the flat square sides of the square cam follower sleeve 21. Ring 53 is housed in an enlarged recess 60 having slack so as to permit adjustment of ring 53 to center the rod 30 and associated parts.

Mounted on the outer end 61 of rod 49 is a plate 62 in position to engage the arm 63 of a lever having a pivot or hinge at 64 on a circular spring 65, the finger 18 being carried at the outer end of the lever arm 66 at the other side of the pivot 64. Plate 62 is circular and is thus in position to act on arm 63 regardless of the rotative position of the flyer and its finger 18. The flyer 17 is somewhat in the shape of a cup and finger 18 freely extends through an opening 43 in the wall 67 of the flyer. When handle 45 is operated, the finger 18 is retracted below the cylindrical wall 67 of the flyer, for free spool operation. Handle 45 swings about its heel or inner edge 121, the casing section 47 having an opening 122 through which the shaft 46 projects. Opening 122 is enlarged as shown at 123 at its front lower portion for tilt or rocking movement when the hand operated device 45 is depressed against the action of spring 124 arranged in a recess 125 of the handle 45, the inner end of the spring resting on the casing section 47. Depressing the handle moves the fork 56 forwardly against the end 48 of rod 49 to retract finger 18, finger 18 and handle 45 moving to the position shown in FIG. 4 when handle 45 is released. When the handle 45 is released, the finger 18 moves to the position shown, to intersect the line's path, finger 18 being urged to position shown in FIG. 4 by spring 65 and/or by spring arm 118 on arm 63. Lever 63, 66 is held in position by the spring 65 which is retained by friction at the outer end of the cup-like flyer, this spring having two free ends spaced apart, one of which is shown at 68 in FIG. 4. This end 68 and the other one 69 are shown in FIG. 5.

The tension on fishing line 4 is adjustable. For this purpose, the outer end of rod or shaft 30 is threaded as shown at 70 to engage threads 71 in a sleeve 72 having a cylindrical bearing surface 73 and stop flange 74 rotatably supporting flyer 17. Sleeve 72, as shown in FIG. 12, has opposite flat surfaces 75 and 76 for the corresponding flats like 77 in a washer 78 and a disk spring 79, with washer 78 frictionally bearing against the outer wall 80 of the flyer as shown in FIGS. 4 and 5. The tension in spring 79 is adjusted by a nut 81 having threaded engagement 82 with sleeve 72. A nut 83 is threaded into the outer end of sleeve 72. If the nut 81 were screwed down enough to clamp flyer 17 to shaft 30, the line 4 would not pay out unless the pull were sufficient to wind up the mainspring 32. To make it possible to use less tension and one which is below the breaking point of the line, the nut 81 is adjusted to allow the necessary slippage of flyer 17 against the action of spring 79.

The hollow shaft 31 through the gearing 37, 39 drives the carrier 40 and hollow cylindrical cam 25 of the reciprocating drive at a higher speed than the hollow shaft 31, and carrier 40 through gearing 41, 42 drives the inner shaft 30 at a higher speed than carrier 40.

In normal use, the cord 33 is operated to put tension in the mainspring 32 which is prevented from acting to reel in the line, until desired, under control of the brake 106 which is operated by a push button 107, shown in FIGS. 2, 3, 5 and 7. Referring particularly to FIG. 3, the outer end of the hollow cam 25 has a cylindrical flange 108 which rotates between a leather or other brake shoe 109 glued to the casing part 47 as shown at 110 and an inner similar brake shoe 111 glued to the outer end of an arcuate spring 112 as shown at 113. One end of the spring 112 is fastened to the casing section 47 by a bolt 114. The button 107 is slidably mounted in an aperture 115 in section 47. When button 107 is not pushed in by the operator, being in the position shown in FIG. 3, spring 112 acts to expand and operate button 107 to that position and also operates to clamp the flange 108 between the brake shoes 109 and 111 with enough force to prevent unwinding of spring 32, when wound up and prevent the shaft 30 from rotating and likewise prevent the cam 25 from elevating or operating the spool 16. By operating button 107, the operator can retract the fishing line 4 as desired. When spring 32 is unwound, as described above, the button 34 is operated to rewind the spring, so that the reeling in operation can continue as long as desired.

Referring particularly to FIG. 4, the spring 32 is in one continuous piece with its outer helical portion 116 telescoped over or surrounding its inner helical portion 117, whereby the end 99 of the outer portion is somewhat adjacent the end 100 of the inner portion, resulting in a compact assembly described above. Spring 32 is made by making a straight mandrel having a length equal to the sum of the two portions 116 and 117 with corresponding diameters joined by a conical or sloping portion. The wire to form the spring is wound on this mandrel and then the larger portion corresponding to 116 is turned inside out or telescoped over the inner portion corresponding to 117 to bring the spring into the position shown in the drawings.

Various modification may be made in the invention without departing from the spirit of the following claims.

I claim:

1. An automatic spinning reel comprising a hollow casing having therein a bearing block having a central aperture, a hollow shaft extending through said aperture, an inner shaft in said hollow shaft, a spool fixed to said hollow shaft and a cooperating flyer on said inner shaft, means for reciprocating said hollow shaft and means for rotating said inner shaft, said hollow shaft having a plurality of flat sides, said bearing block having a support carrying a plurality of rollers, one for each of the flat sides of said hollow shaft and means for adjusting the position of said support with respect to said bearing block to center said hollow shaft and said inner shaft in said casing.

2. A fishing reel comprising a casing having therein a rotary flyer and a reciprocating non-rotary spool, means for operating said spool and flyer comprising a unitary spring whereof adjacent helical turns are arranged side by side lengthwise of the axis of said casing, one axial portion of said spring being arranged inside of and in telescoped relation with an adjoining outer portion of said spring whereby the corresponding inner and outer ends of said unitary spring are adjacent to each other, means for winding one of said spring ends and means for driving said spool and flyer from the other spring end.

3. A fishing reel comprising a casing having therein a spool having a reciprocating drive, and a rotary flyer associated with said spool, a hollow shaft having therein an inner flyer shaft, means for driving said hollow shaft, a ring gear fixed to said casing, a carrier fixed to said reciprocating drive and having a gear, said hollow shaft having a planetary gear meshing with said ring gear and said carrier gear, said flyer shaft having a gear fixed thereto, said carrier having a planetary gear meshing with said ring gear and said flyer shaft gear.

4. A fishing reel according to claim 3, said flyer shaft gear and its said planetary gear having a different number of teeth.

5. A fishing reel comprising a casing having therein a spool having a reciprocating drive, and a rotary flyer for said spool, a hollow shaft having therein an inner shaft for said flyer, means for driving said hollow shaft, gearing for driving said reciprocating drive by and at a higher speed than said hollow shaft, said gearing including a driven element floating on said inner shaft, said driven element driving other gearing which drives said flyer shaft by and at higher speed than said driven element of said first mentioned gearing.

6. A fishing reel according to claim 5, said gearings including meshing gears having different numbers of teeth constituting a differential gearing coupling between said reciprocating spool drive and said flyer shaft, to prevent a line from piling up on the spool.

7. A fishing reel, comprising a casing and a mainspring therein, a winding drum having rewind spring and dogs, a winding head having cooperating notches for said dogs for transmission of power from said drum to said head, said winding head having a connection to one end of said mainspring, said winding head having dogs and said casing having cooperating notches for said last mentioned dogs for preventing said head from unwinding, and a cord for operating said drum.

8. A fishing reel according to claim 7, said casing having a sleeve bearing on which said drum and head are rotatably mounted side by side.

9. A fishing reel comprising a casing having a reciprocating drive for a spool and a rotary flyer shaft, a mainspring acting to operate said reciprocating drive, a drive from said reciprocating drive to said flyer shaft, a brake, a spring urging said brake to braking position, said brake acting on said reciprocating drive, and a button on said casing for operating said brake spring to release said brake.

10. A fishing reel according to claim 9, said reciprocating drive comprising a hollow cup having a brake shoe between it and said casing, said brake spring being arcuate and arranged inside said cup and having a shoe between it and the inside of said cup, means for fixing one portion of said brake spring to said casing, said casing having means supporting said button for inward movement to operate said brake spring.

References Cited in the file of this patent

UNITED STATES PATENTS

| | | |
|---|---|---|
| 2,148,185 | Blocker | Feb. 21, 1939 |
| 2,175,756 | Maury | Oct. 10, 1939 |
| 2,220,017 | Maynes | Oct. 29, 1940 |
| 2,587,257 | Weisblatt | Feb. 26, 1952 |
| 2,711,292 | Taggart et al. | June 21, 1955 |
| 2,713,463 | Sarah | July 19, 1955 |
| 2,723,808 | Elliott et al. | Nov. 15, 1955 |
| 2,772,839 | Morton | Dec. 4, 1956 |
| 2,775,417 | Freund | Dec. 25, 1956 |
| 2,834,559 | Nagy | May 13, 1958 |
| 2,843,333 | Jones | July 15, 1958 |
| 2,854,200 | Montgomery | Sept. 30, 1958 |
| 2,915,258 | Hull | Dec. 1, 1959 |

FOREIGN PATENTS

| | | |
|---|---|---|
| 598,126 | Great Britain | Feb. 11, 1948 |
| 603,605 | Great Britain | June 18, 1948 |
| 993,035 | France | July 18, 1951 |
| 1,115,185 | France | Dec. 26, 1955 |